(12) United States Patent
Margetis et al.

(10) Patent No.: US 11,666,158 B1
(45) Date of Patent: Jun. 6, 2023

(54) BULK PET FOOD DISPENSER

(71) Applicant: Canidae, LLC, Stamford, CT (US)

(72) Inventors: Peter Margetis, Louisville, KY (US); Wallace Arnold Shaw, II, Nashville, TN (US); Sarah Shah, Cos Cob, CT (US)

(73) Assignee: Canidae, LLC, Stamford, CT (US)

(*) Notice: Subject to any disclaimer, the term of this patent is extended or adjusted under 35 U.S.C. 154(b) by 0 days.

(21) Appl. No.: 17/651,349

(22) Filed: Feb. 16, 2022

(51) Int. Cl.
*A47F 1/035* (2006.01)
*A01K 5/02* (2006.01)

(52) U.S. Cl.
CPC ............ *A47F 1/035* (2013.01); *A01K 5/0283* (2013.01)

(58) Field of Classification Search
CPC ........... B65B 51/146; B65B 1/32; B65B 3/28; B65B 5/067; B65B 43/465; G01G 13/026; G07F 13/04; F25D 2331/801; A47F 1/03; A47F 1/035; A01K 5/0283
See application file for complete search history.

(56) References Cited

U.S. PATENT DOCUMENTS

| | | | | |
|---|---|---|---|---|
| 5,581,982 A | * | 12/1996 | Schroeder | B65B 5/067 53/469 |
| 5,771,667 A | * | 6/1998 | McGregor | B65B 51/146 53/481 |
| 6,295,790 B1 | * | 10/2001 | McGregor | B65B 1/28 53/374.3 |
| 2016/0029592 A1 | * | 2/2016 | Springer | G08C 17/02 119/51.11 |

* cited by examiner

*Primary Examiner* — Donnell A Long
(74) *Attorney, Agent, or Firm* — Venable LLP; Ryan T. Ward

(57) ABSTRACT

A system for bulk pet food dispersing. The system has one or more scales, and for each scale a pulley system and a pair of rails which can be used to lift a bulk bag of pet food into place above the scale and a gravity-fed dispenser, which can include a dispenser control. The bulk bag of pet food can attach to the pulley system using hooks, eyelets, knots, chains, etc., then raised into place using a crank which moves the pulley system. Users can then disperse the pet food from the raised bulk bag into their own bag using a dispenser control, such as a handle or lever.

20 Claims, 8 Drawing Sheets

BULK PET FOOD DISPENSER

BACKGROUND

1. Technical Field

The present disclosure relates to a bulk pet food dispenser, and more specifically to a bulk pet food dispenser which uses a crank and pulley system to raise bags above a dispenser and scale.

2. Introduction

Gravity food and grain dispensers allow food products to be stored at a higher elevation than a dispensing outlet. When a handle or lever is pulled, gravity allows the food product to flow into a bag or other container for consumption, sale, or other use. Often these devices allow the user to control the flow rate, which allows the user to adjust how fast (or slow) they want the food product to leave the dispenser. These gravity food and grain dispensers work best with relatively small food items, such as nuts (sometimes seen at grocery stores), cereals (often seen in hotels), seeds (such as wheat or corn seeds), or beans (such as coffee, black, or pinto beans).

Kibble is a pelletized form of animal food which is coarsely ground fodder made from raw materials and additives. For example, the bags of pet food one can buy at the store contain kibble prepared using blends designed for specific animals/pets. However, previous gravity food dispensers are not built to assisting in lifting the heavy bags of kibble to a position where gravity can help disperse the kibble, support the bag before dispersing, and disperse the kibble according to user engagement.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A system configured to perform the concepts disclosed herein can include: at least one scale; and for each scale within the system: a gravity-fed dispenser located directly above the each scale, the gravity-fed dispenser comprising a dispenser control; a pair of curved rails extending from an exterior edge of the each scale to above the gravity-fed dispenser; a pulley with hooks; and a crank configured to raise and lower the pulley from a position in front of the pair of curved rails to a position above the gravity-fed dispenser; wherein: the hooks attach to a bag of pet food; the bag of pet food rests on the pair of curved rails as the crank raises the pulley; the bag of pet food empties pet food into the gravity-fed dispenser when the pulley is in the position above the gravity-fed dispenser; and the at least one scale registers a weight of dispensed pet food when a user opens the gravity-fed dispenser using the dispenser control.

A bulk pet food distribution machine configured to perform the concepts disclosed herein can include: a scale; a gravity-fed dispenser located directly above the scale, the gravity-fed dispenser comprising a dispenser control; a pair of curved rails extending from an exterior edge of the scale to above the gravity-fed dispenser; a pulley with hooks; and a crank configured to raise and lower the pulley from a position in front of the pair of curved rails to a position above the gravity-fed dispenser; wherein: the hooks attach to a bulk bag of pet food; the bulk bag of pet food rests on the pair of curved rails as the crank raises the pulley; the bulk bag of pet food empties into the gravity-fed dispenser when the pulley is in the position above the gravity-fed dispenser; and the scale registers a weight of dispensed pet food when a user opens the gravity-fed dispenser using the dispenser control.

DETAILED DESCRIPTION

Figure 1:
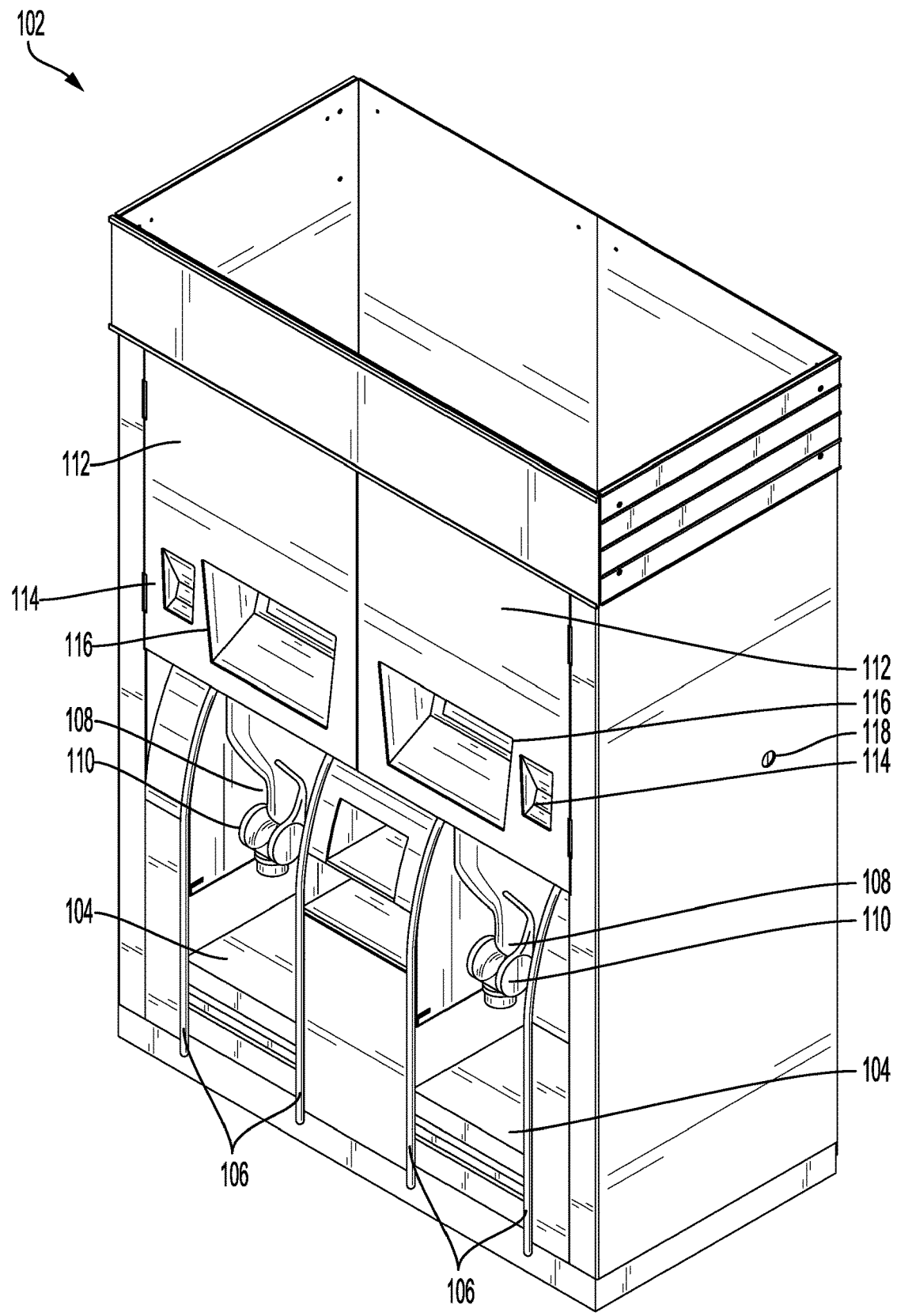
FIG. 1 illustrates a front perspective view of an example system.

Various embodiments of the disclosure are described in detail below. While specific implementations are described, it should be understood that this is done for illustration purposes only. Other components and configurations may be used without parting from the spirit and scope of the disclosure.

Systems configured as disclosed herein allow for bulk pet food dispensing to customers or other individuals. Whereas pet owners currently generally buy previously standardized, prepared/manufactured bags of kibble for cats or dogs, systems configured as disclosed herein allow customers to buy as much (or little) of the kibble as they wish. A consumer using the machine walks up to the machine preloaded with kibble, puts their own bag or other bag made for consumers on a scale, and pulls a lever or handle which allows the kibble to fall onto the scale via gravity. When the bag fills to the amount or weight of kibble that the consumer desires, the user can close the handle and proceed to checkout with their filled bag. Non-exclusive exemplary advantages of this design from a consumer point of view include allowing the consumer to purchase custom amounts of the pet food, rather than standardized amounts; it reduces the need to packaging individual bags, with consumer able to reuse previously used bags; the ability to test if their pet likes a new type of pet food without purchasing an entire bag.

Bulk bags of pet food, as described herein, can refer to any loose bag of pet food not being directly sold to a consumer by the owner or retailer using the machine disclosed herein. "Loose" refers to the bag containing more than one unpackaged piece of pet food within the bag. Non-limiting examples of bulk bags of pet food can include: a bag of loose pet food purchased by a store or retailer to be opened by the retailer with the contents thereof sold piecemeal to consumers (i.e., a portion of the pet food within the bag would be sold to the consumers, but not the original bag itself); and a heavy bag (e.g., more than five pounds (2.26 kg) of loose pet food having handles, loops, or other engagement mechanisms. In some cases, a retailer may insert a bulk bag of pet food into the machine for piecemeal dispersing, while also selling those same bags separately and directly to consumers. Systems configured as disclosed herein use both bulk bags of pet food or other types of bags of pet food.

The machine operates using a pulley system which raises bulk bags of the pet food above the scale. The pulleys can have attachment mechanisms (such as one or more hooks, chains, knots, one or more eyelets, hook and loop systems, etc.) which attach to the bulk bags, and a crank on the side of the machine which can raise/lower the attachment mechanism. To avoid damaging the machine and to ease the lifting of the bulk bag of pet food into the correct location for dispersing, the machine has, for each scale, a pair of curved rails which extend from the front of the machine to directly above the scales. For example, when loading a new bulk bag of pet food into the machine, the machine operator (such as a store associate) can place the bulk bag in front of the scale and rails. The machine operator attaches the bulk bag to the attachment mechanism of the pulley system, then uses a crank lever on the side of the machine to raise the bag up over the scale. As the bag is being raised, it rests on the pair of curved rails.

Above the scale is a gravity-fed dispenser. This gravity-fed dispenser includes a funnel portion, which receives the kibble/pet food from the bulk bag of pet food, and is connected to a dispenser control (such as a lever or handle) which allows the kibble to flow via gravity from the funnel to the consumer's bag resting on the scale. The machine operator continues raising the bag (which is resting on the curved rails) until the bag is directly above the gravity-fed dispenser, which in turn is above the scale. The machine operator can then open the bag of bulk pet food, such that the pet food flows via gravity into the funnel portion of the gravity-fed dispenser. In some configurations, the bulk bag of pet food can include an extendable column which, when extended, allows the pet food to flow into the funnel portion of the gravity-fed dispenser while limiting the ability for the pet food to overflow the funnel portion. For example, if the bulk pet food bag contains kibble, the machine operator can extend the column to the funnel portion and the kibble, rather than overflowing the funnel, will stay within the column, supported horizontally by the column and supported at the bottom of the column by the funnel portion. Exemplary diameters of the column can be 8 inches (20.32 cm) or 10 inches (25.4 cm), though other diameters of the column are likewise possible. Furthermore, in some configurations the column can have other shapes than a circle. Exemplary shapes include squares, triangles, rectangles, ovals, and/or any other contiguous shape.

The machine can include cabinet doors which, once the loaded bulk bag of pet food is in it final/dispersing position, can enclose the bulk bag within the body of the machine. The cabinet doors can include a display (along with any necessary computing equipment) which displays the amount of pet food currently dispersed and the associated cost of that pet food. The cabinet doors can also contain a receipt dispenser, allowing printing of a receipt for the dis bursed pet food which the consumer can take to a cash register to pay. In some configurations, the system can be configured to allow users to pay immediately using near field communications (such as APPLE PAY) from mobile devices, such as smart phones or tablets. In such configurations, the computing equipment to enable such wireless transactions can be stored in the cabinet doors or in any other location within the system.

With the bulk bag of pet food in position, directly above the gravity-fed dispenser, the machine operator can remove the crank lever from the side of the machine (this step is optional, but may be prudent to prevent customers from inadvertently moving the bulk bag of pet food after a store associate moves it into the proper location). In other configurations, the pulley can be controlled using an electrically powered winch or other winding machine, and can, for example, allow the machine operator to press one button to raise the pulley and another button to lower the pulley.

FIG. 1 illustrates a front perspective view of an example system 102. In this example the system has two scales 104, though other systems can have a single scale 104 and accompanying system elements, or more than two scales. For example, some systems may have three or four different scales 104 and accompanying system elements within a single machine. As illustrated, the system 102 contains, for each scale 104, system elements such as a gravity-fed dispenser 108 (such as a funnel, with a large opening on top to receive pet food, and a smaller opening on the bottom to disperse pet food) connected to a dispenser control 110, which can use levers, handles release buttons, and/or any other control mechanism to release pet food from the gravity-fed dispenser 108 on to the scale 104. The gravity-fed dispenser 108 and dispenser control 110 are located within the system 102 directly above a scale 104.

The illustrated, example system 102 also contains cabinet doors 112 behind which the bulk bag of pet food sits while being dispersed. The bulk bag of pet food is raised up above the gravity-fed dispenser 108 using a pair of curved rails 106 and a pulley system. The pulley system attaches to the bulk bag of pet food while the bulk bag rests on the ground in front of the machine 102. The location where the bulk bag of pet food rests on the ground prior to being loaded into the machine 102 is also directly in front of the respective scale 104 the pet food the bag contains will be dispersed onto. As the bag is pulled up into the machine using the pulley system with a crank, the bag rests on the pair of curved rails 106. The crank, not illustrated in FIG. 1, attaches via a hole 118.

Also illustrated in FIG. 1 are is a display 116 built into the cabinet door 112, which can show the amount of pet food which has been dispersed onto the scale 104, and which can be accompanied by a computer terminal and/or keys which allow the user to indicate when they are done dispersing the pet food. Once the user has indicated they are done dispersing the pet food, the system can print a receipt using a receipt printer 114 embedded within the cabinet door 112. In other configurations, the locations of the display 116, computer terminal, buttons, and/or receipt printer 114 can vary as desired.

Figure 2:
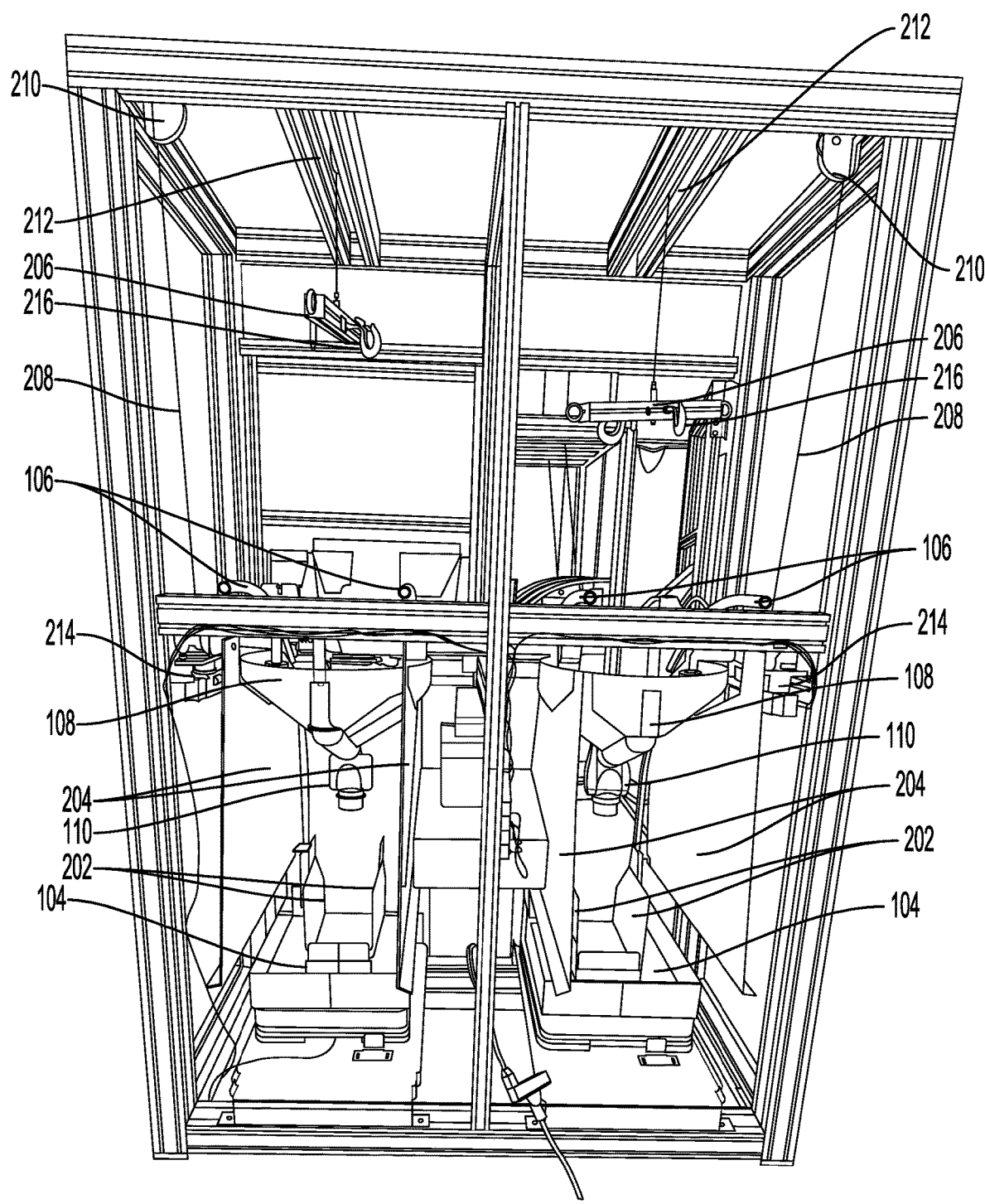
FIG. 2 illustrates a rear view of an example system.

FIG. 2 illustrates a rear view of an example system 102. In this example again two separate scales 104 are illustrated, with their respective gravity-fed dispenser 108 and dispenser controls 110, as well as their respective pairs of curved rails 106, which can connect to the back portion of the frame of the machine, such that the pair of curved rails 106 extend from the ground at the front of the machine 102 near the front of the scales 104, to the rear of the machine 104 above the scales 104.

In FIG. 2 are also left and right panels 202, which are located on or to the side of the scales 104. These left and right panels 202 can support consumer bags while dispersing the bulk bag of pet food onto the scales 104. Also illustrates are larger panels 204, which are further to the sides of the scales 104 for the purpose of blocking views of internal wires and components of the system 102.

FIG. 2 also shows the pulley system, which includes the pulley wire 208, a first wheel 210, a second wheel 212 or direction change mechanism, and an attachment bar 206 which can have hooks 216, eyelets, and/or other engagement mechanisms which can attach to a bulk bag of pet food. The pulley system operates by a user operating a crank or winch which spools 214 the pulley wire 208, and which extends up the side of the system 102, connects with the first wheel 210 (preferably via a furrowed or recessed groove within the first wheel 210), where the pulley wire 208 changes direction and extends laterally from the side of the system to above the vertically aligned scale 104, gravity-fed dispenser 108, and dispenser control 110. There, at the second wheel 212 or direction change mechanism, the pulley wire 208 is directed down, where it connects to the attachment bar 206. In some configurations, the spool of pulley wire 214 may be a winch or other mechanism for wire storage and disbursement as known to those of skill in the art.

Figure 3:
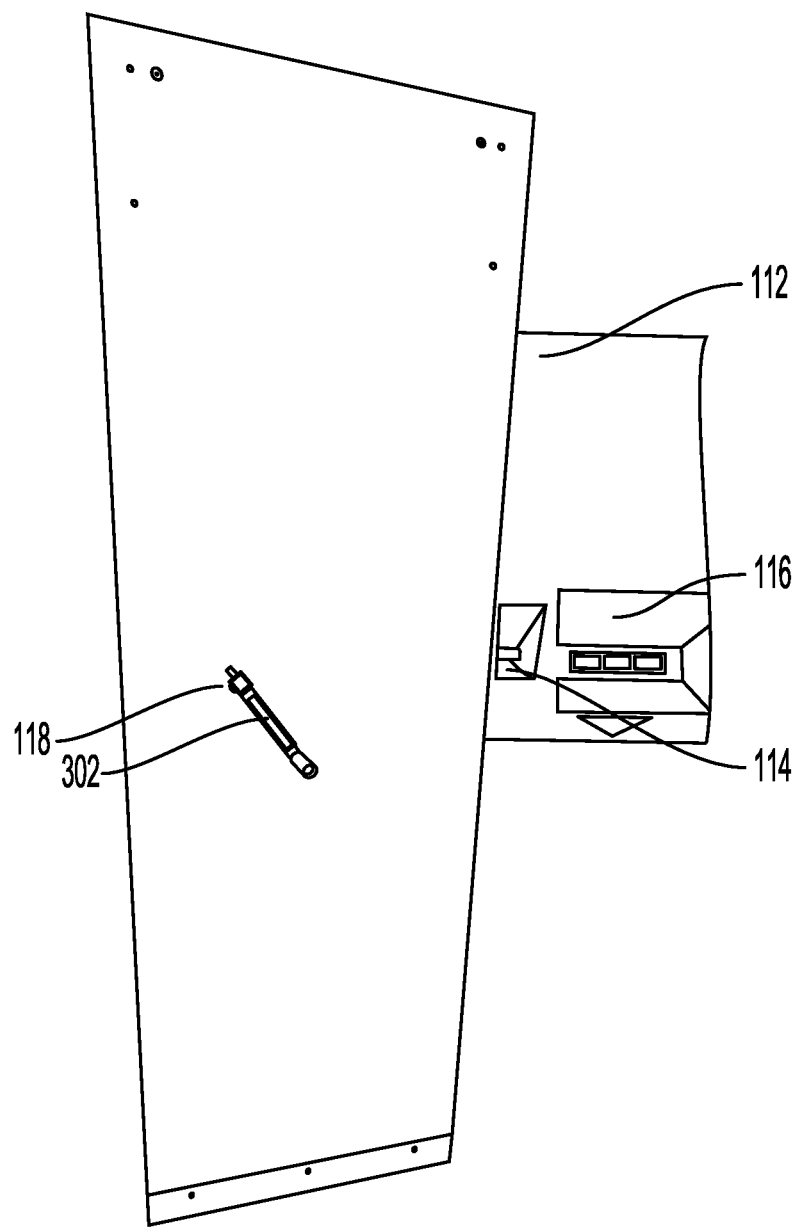
FIG. 3 illustrates a side view of an example system.

FIG. 3 illustrates a side view of an example system 102, with the cabinet door 112 open. In this view are also the computer display 116, the receipt printer 114, and the crank handle 302 which can be used to manipulate the pulley system illustrated in FIG. 2. Specifically, as the user turns the crank handle 302, the pulley wire 208 is spooled into or out of the spool of pulley wire 208, depending on the direction the user turns the crank handle.

Figure 4A:
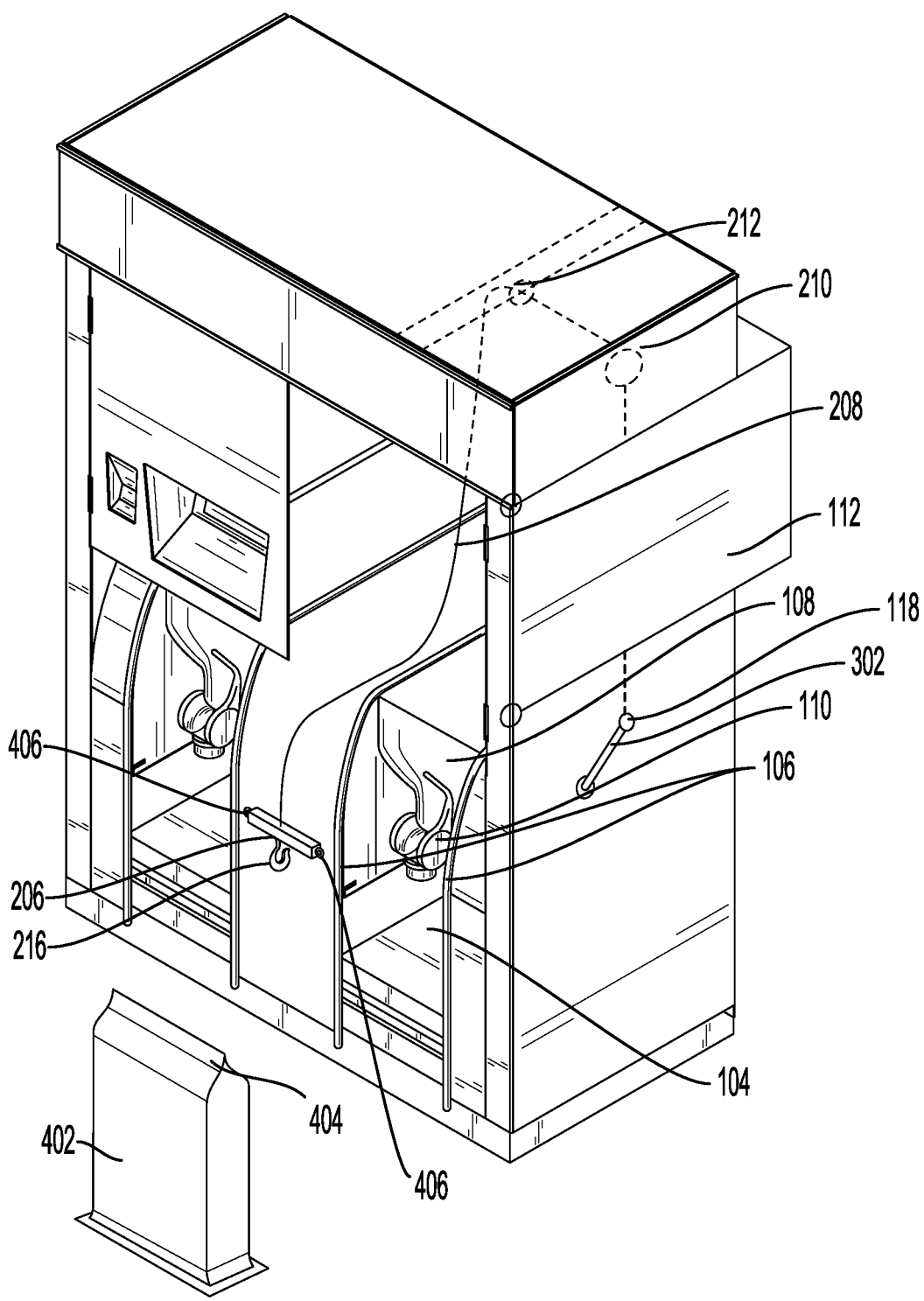
FIG. 4A illustrates an example of a bag of pet food being loaded into an example system, with the bag sitting in front of the example system.
Figure 4B:
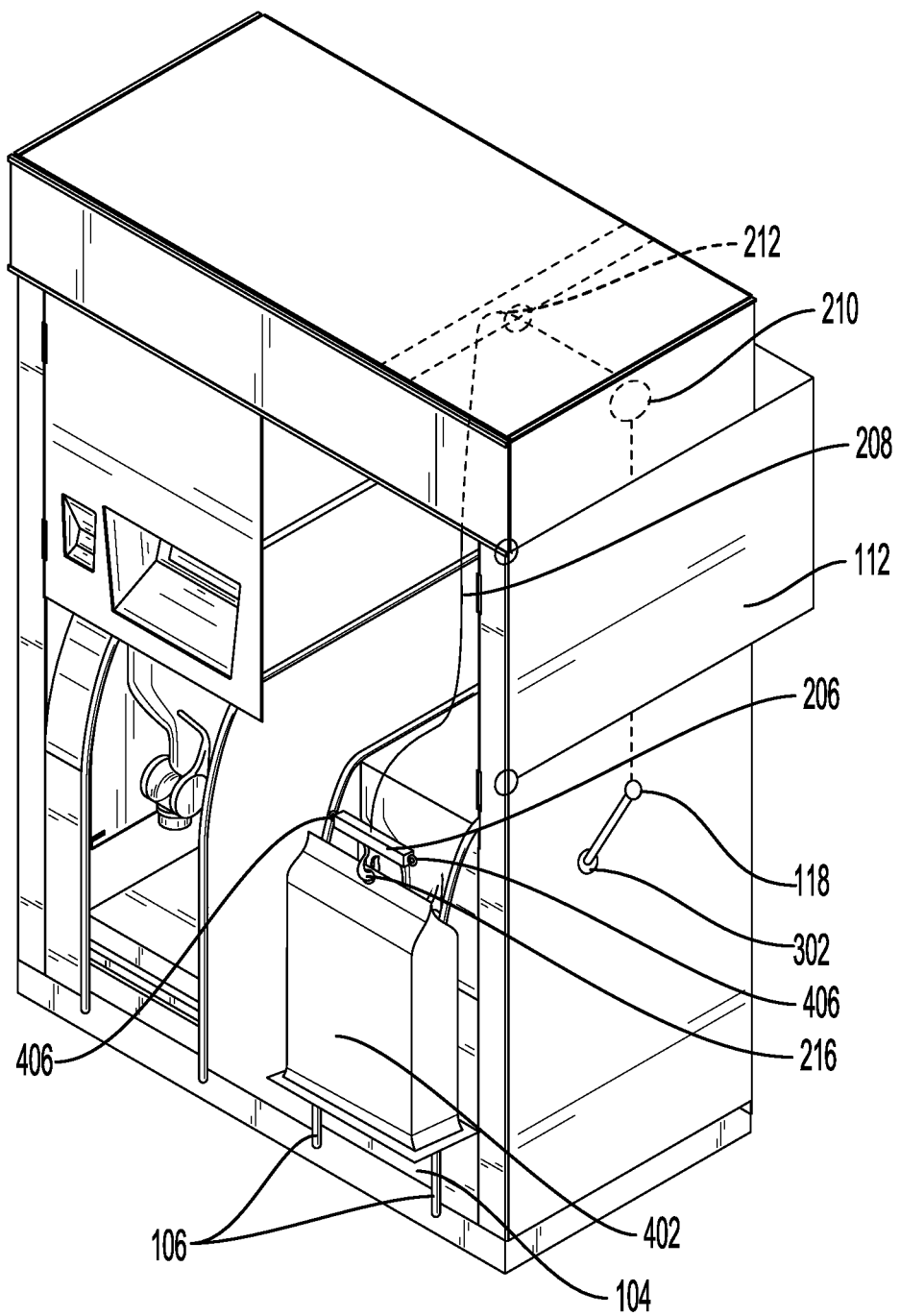
FIG. 4B illustrates an example of a bag of pet food begin loaded into an example system, with the bag resting on rails while being lifted into the example system.
Figure 4C:
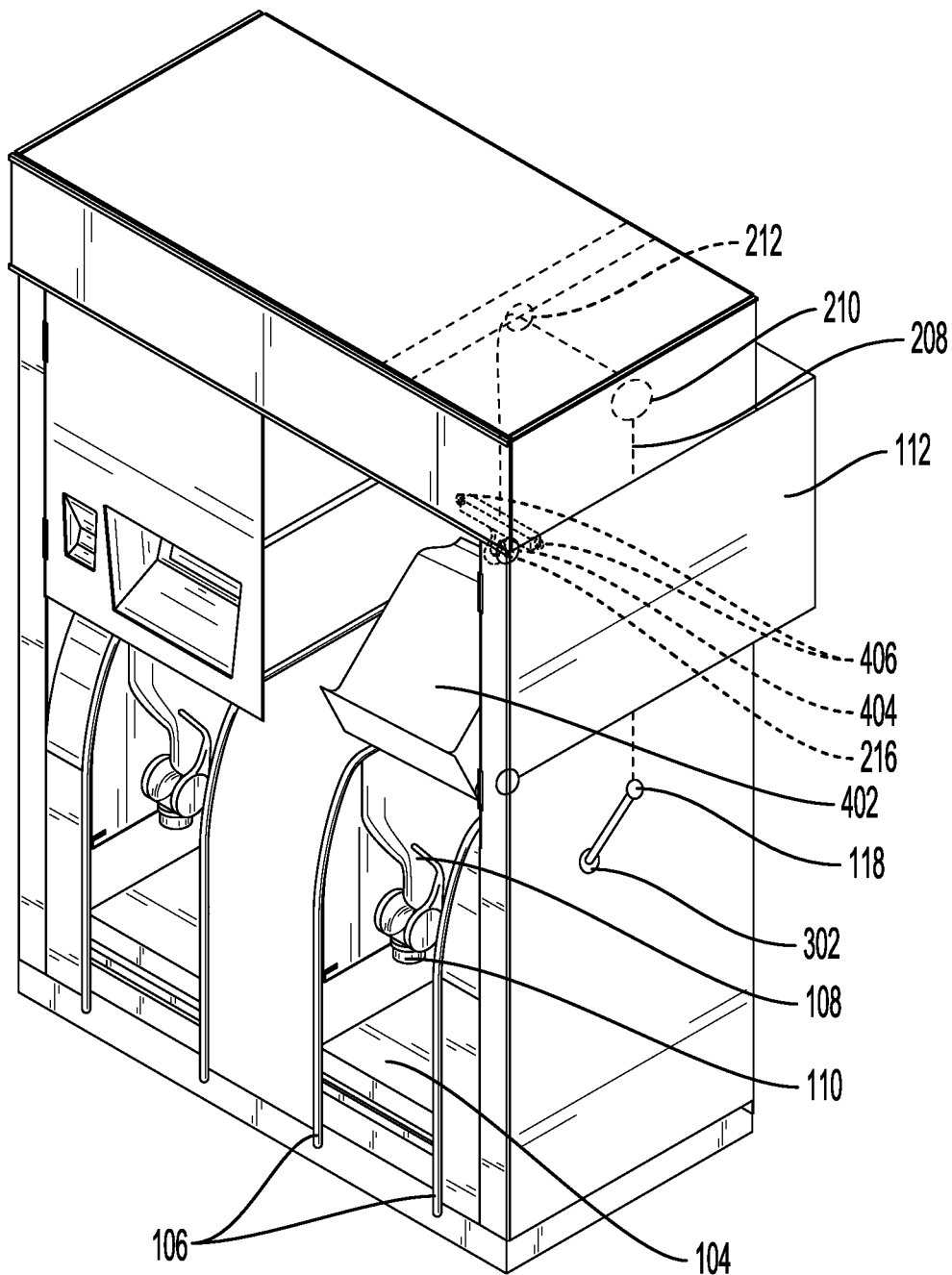
FIG. 4C illustrates an example of a bag of pet food loaded into an example system.

FIGS. 4A, 4B, and 4C illustrate a bulk bag of pet food 402 being loaded into the machine. Beginning with FIG. 4A, FIG. 4A illustrates the bulk bag of pet food 402 being loaded into an example system 102, with the bag 402 sitting in front of the example system. As illustrated, the bulk bag of pet food 402 sits on the ground directly in front of the scale 104 which is to be used to disperse the pet food. This position is also directly in front of the lower portion of the pair of curved rails 106 associated with that scale 104, and lower than the gravity-fed dispenser 108 and dispenser control 110. In this example, the cabinet door 112 is open so that the bulk bag of pet food 402 can be raised through the open door to a position directly above the gravity-fed dispenser 108, the dispenser control 110, and the scale 104.

To raise the bulk bag of pet food 402, the pulley attachment bar 206 is lowered using the crank handle 302, which is connected to the spool 214 of pulley wire 208 via the hole 118. With the pulley attachment bar 206 extended down, the hook(s) 216 of the attachment bar can be connected to the bulk bag of pet food 402. For example, the hook(s) 216 may attach to a handle 404, loop, or other connection point on the bulk bag of pet food 402. The illustrated attachment bar 206 also contains eyelets 406, which can be used to connect to chains, loops, or other engagement mechanisms of the bag 402. Once the bag 402 is connected to the attachment bar 206, the user can turn the crank handle 302 to begin raising the bag 402 into position.

FIG. 4B illustrates an example of a bag of pet food 402 begin loaded into an example system, with the 402 bag resting on the pair of curved rails 106 while being lifted into the example system. As illustrated, the bag 402 is about halfway up the pair of curved rails 106, with the amount of pulley wire/cable 208 available being reduced as the user winds the cable using the crank handle 302.

FIG. 4C illustrates an example of a bag of pet food fully loaded into an example system. At this point the bulk bag of pet food 402 is directly over the scale 104, the gravity-fed dispenser 108, and the dispenser control 110. In some configurations, the bag 402 can continue to rest on the pair of curved rails 106, whereas in other configurations the pulley can be configured to lift the bag 402 off of the rails 106. Likewise, once in its final location the bag 402 can continue to be attached to the pulley via the pulley attachment bar 206 (using the hook(s) 216 and/or the eyelets 406), or the bag 402 can be disconnected from the pulley system.

Once the bag 402 is in its final location for dispersing pet food, the user can disconnect the crank handle 302 from the hole 118, preventing unauthorized raising or lowering of the bag 402. At that time the user can also close the cabinet door 112 and/or open the bulk bag of pet food 402 such that pet food begins to flow into the gravity-fed dispenser 108. In some configurations, the bulk bag of pet food 402 can include an extendible column which, when extended, directs the flow of the pet food into the gravity-fed dispenser 108. This column can be circular, square, rectangular, triangular, or any other contiguous shape. Preferably the column would have a diameter of at least 10 inches (25.4 cm), which assists in preventing kibble pet food from becoming jammed within the column, which may happen more frequently with smaller columns. The column can also prevent the pet food from completely flowing out of the bulk bag of pet food 402 and overflowing the gravity-fed dispenser 108.

Figure 5:
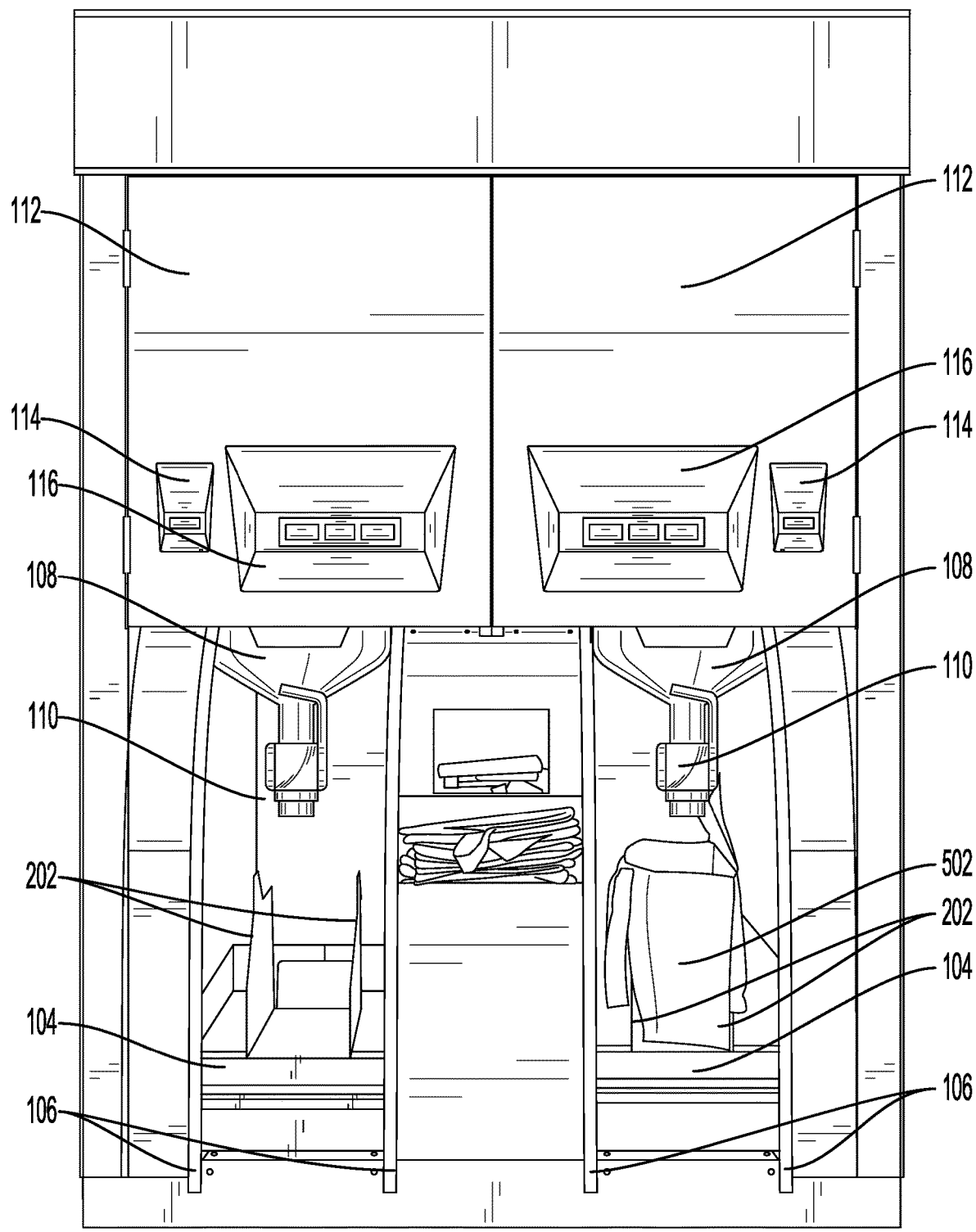
FIG. 5 illustrates a front view of an example system as a user prepares to disperse pet food.

FIG. 5 illustrates a front view of an example system as a user prepares to disperse pet food. In this example, the bag of pet food has been loaded into position within the system, and the cabinet doors are closed. The user can approach the system and place a bag 502 onto the scale 104. As illustrated, the system may contain left and right side panels 202 which can support the bag 502 while it is being filled with pet food. In some configurations, the bag 502 can attach to the side panels 202 using tabs on the side panels 202 and holes or pockets within the bag 502. In other configurations, the side panels 202 do not attach to the bag 502, and only support the bag 502 as it is filled with pet food falling from the gravity-fed dispenser 108 through the dispenser control 110.

An example of the system could include: at least one scale; and for each scale within the system: a gravity-fed dispenser located directly above the each scale, the gravity-fed dispenser comprising a dispenser control; a pair of curved rails extending from an exterior edge of the each scale to above the gravity-fed dispenser; a pulley with hooks; and a crank configured to raise and lower the pulley from a position in front of the pair of curved rails to a position above the gravity-fed dispenser; wherein: the hooks attach to a bag of pet food; the bag of pet food rests on the pair of curved rails as the crank raises the pulley; the bag of pet food empties pet food into the gravity-fed dispenser when the pulley is in the position above the gravity-fed dispenser; and the at least one scale registers a weight of dispensed pet food when a user opens the gravity-fed dispenser using the dispenser control.

In some configurations, for each scale within the system, the system can further include: a processor in communication with the scale; and a display device in communication with the processor; and when the scale registers weight of the dispensed pet food, the processor generates a display signal, the display signal causing the display device to display the weight.

In some configurations, the dispenser control can include at least one of a lever and a handle.

In some configurations, the bag of pet food empties into the gravity-fed dispenser using a column which extends from the bulk bag of pet food. In such configurations, the column can have, for example, a diameter of ten inches (25.4 centimeters).

In some configurations, for each scale within the system, the system can further include: a left upright metal plane located to the left of the scale, the left upright metal plane configured to engage a pet food receptacle; and a right upright metal plane located to the right of the scale, the right upright metal plane configured to engage the pet food receptacle, such that when dispensing pet food from the gravity-fed dispenser into the pet food receptacle, the left upright metal plane and the right upright metal plane hold the pet food receptacle.

In some configurations, the pulley can further include a pair of eyelets, the pair of eyelets configured to attach to at least one chain on the bulk bag of pet food.

In some configurations, the system has two scales.

In some configurations, the bag of pet food holds kibble. In such configurations, the kibble can be made for at least one of cats and dogs.

In some configurations, the handle of the crank is removable.

Figure 6:
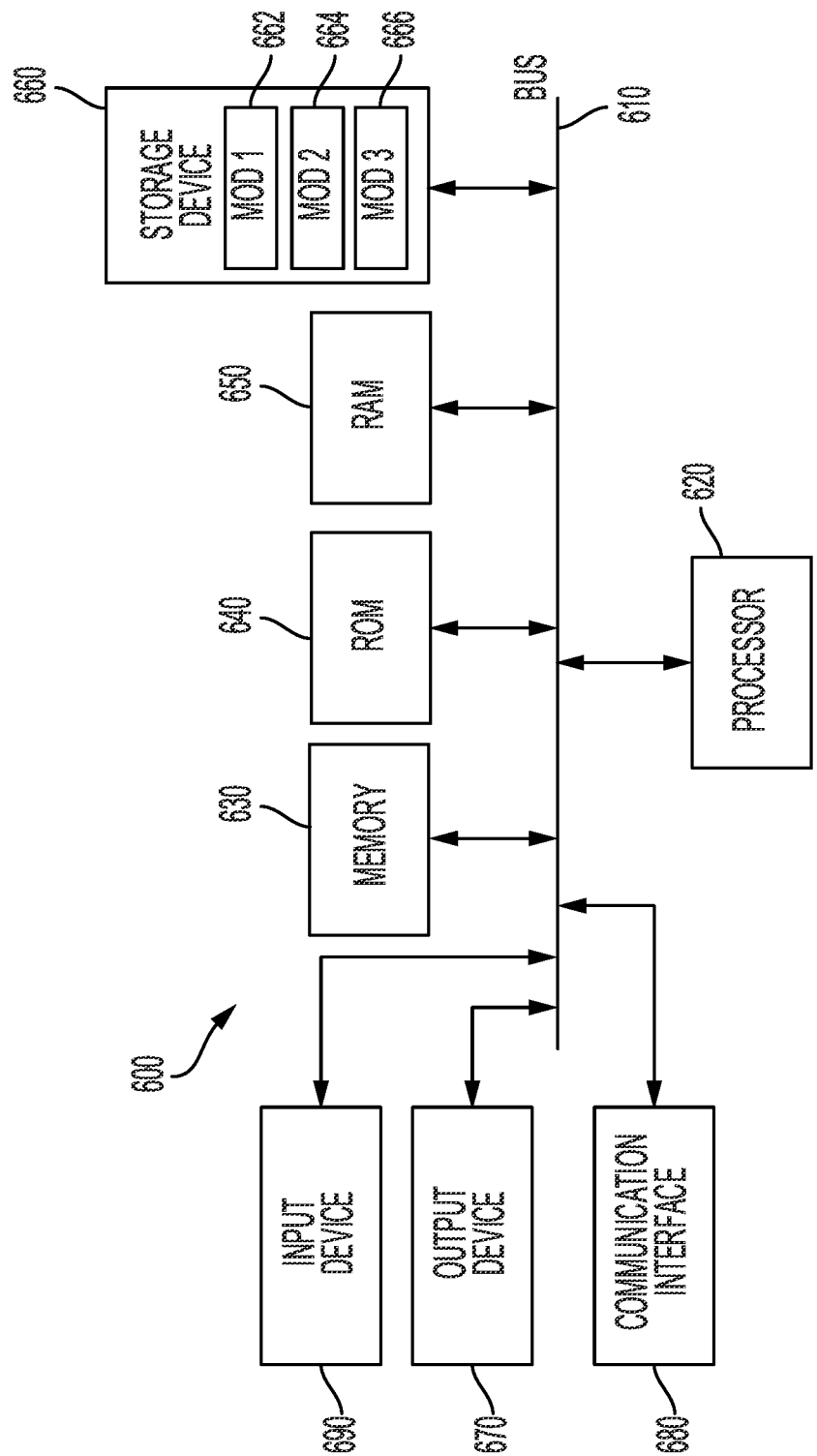
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
   at least one scale; and
   for each scale within the system:
   a gravity-fed dispenser located directly above the each scale, the gravity-fed dispenser comprising a dispenser control;
   a pair of curved rails extending from an exterior edge of the each scale to above the gravity-fed dispenser;
   a pulley with hooks; and a crank configured to raise and lower the pulley from a position in front of the pair of curved rails to a position above the gravity-fed dispenser;

wherein:
the hooks attach to a bag of pet food;
the bag of pet food rests on the pair of curved rails as the crank raises the pulley;
the bag of pet food empties pet food into the gravity-fed dispenser when the pulley is in the position above the gravity-fed dispenser; and
the at least one scale registers a weight of dispensed pet food when a user opens the gravity-fed dispenser using the dispenser control.

2. The system of claim 1, wherein:
for each scale within the system, the system further comprises:
a processor in communication with the scale; and
a display device in communication with the processor; and
when the scale registers weight of the dispensed pet food, the processor generates a display signal, the display signal causing the display device to display the weight.

3. The system of claim 1, wherein the dispenser control comprises at least one of a lever and a handle.

4. The system of claim 1, wherein the bag of pet food empties into the gravity-fed dispenser using a column which extends from the bag of pet food.

5. The system of claim 4, wherein the column has a diameter of ten inches (25.4 centimeters).

6. The system of claim 1, wherein:
for each scale within the system, the system further comprises:
a left upright metal plane located to the left of the scale, the left upright metal plane configured to engage a pet food receptacle; and
a right upright metal plane located to the right of the scale, the right upright metal plane configured to engage the pet food receptacle,
such that when dispensing pet food from the gravity-fed dispenser into the pet food receptacle, the left upright metal plane and the right upright metal plane hold the pet food receptacle.

7. The system of claim 1, wherein:
the pulley further comprises a pair of eyelets, the pair of eyelets configured to attach to at least one chain on the bag of pet food.

8. The system of claim 1, wherein the system has two scales.

9. The system of claim 1, wherein the bag of pet food holds kibble.

10. The system of claim 9, wherein the kibble is made for at least one of cats and dogs.

11. A bulk pet food distribution machine, comprising:
a scale;
a gravity-fed dispenser located directly above the scale, the gravity-fed dispenser comprising a dispenser control;
a pair of curved rails extending from an exterior edge of the scale to above the gravity-fed dispenser;
a pulley with hooks; and
a crank configured to raise and lower the pulley from a position in front of the pair of curved rails to a position above the gravity-fed dispenser;

wherein:
the hooks attach to a bulk bag of pet food;
the bulk bag of pet food rests on the pair of curved rails as the crank raises the pulley;
the bulk bag of pet food empties into the gravity-fed dispenser when the pulley is in the position above the gravity-fed dispenser; and
the scale registers a weight of dispensed pet food when a user opens the gravity-fed dispenser using the dispenser control.

12. The bulk pet food distribution machine of claim 11, further comprising:
a processor in communication with the scale; and
a display device in communication with the processor,
wherein when the scale registers weight of the dispensed pet food, the processor generates a display signal, the display signal causing the display device to display the weight.

13. The bulk pet food distribution machine of claim 11, wherein the dispenser control comprises at least one of a lever and a handle.

14. The bulk pet food distribution machine of claim 11, wherein the bulk bag of pet food empties the dispensed pet food into the gravity-fed dispenser using a column which extends from the bulk bag of pet food.

15. The bulk pet food distribution machine of claim 14, wherein the column has a diameter of ten inches (25.4 centimeters).

16. The bulk pet food distribution machine of claim 11, further comprising:
a left upright metal plane located to the left of the scale, the left upright metal plane configured to engage a pet food receptacle; and
a right upright metal plane located to the right of the scale, the right upright metal plane configured to engage the pet food receptacle,
such that when dispensing pet food from the gravity-fed dispenser into the pet food receptacle, the left upright metal plane and the right upright metal plane hold the pet food receptacle.

17. The bulk pet food distribution machine of claim 11, wherein:
the pulley further comprises a pair of eyelets, the pair of eyelets configured to attach to at least one chain on the bulk bag of pet food.

18. The bulk pet food distribution machine of claim 11, wherein the bulk bag of pet food holds kibble.

19. The bulk pet food distribution machine of claim 18, wherein the kibble is made for at least one of cats and dogs.

20. The bulk pet food distribution machine of claim 11, wherein a handle of the crank is removable.

* * * * *